United States Patent
Aschauer et al.

(10) Patent No.: US 7,752,276 B2
(45) Date of Patent: Jul. 6, 2010

(54) DATA PROCESSING DEVICE FOR USE IN AN AD-HOC NETWORK, AND CORRESPONDING AD-HOC NETWORK

(75) Inventors: Rudolf Aschauer, Vienna (AT); Robert Burian, Vienna (AT); Christoph Dorn, Vienna (AT); Christian Ploninger, Vienna (AT); Christina Wu, Vienna (AT)

(73) Assignee: Siemens Aktiengesellschaft, Munich (DE)

( * ) Notice: Subject to any disclaimer, the term of this patent is extended or adjusted under 35 U.S.C. 154(b) by 410 days.

(21) Appl. No.: 11/660,643

(22) PCT Filed: Aug. 17, 2005

(86) PCT No.: PCT/EP2005/054039

§ 371 (c)(1),
(2), (4) Date: Feb. 20, 2007

(87) PCT Pub. No.: WO2006/027312

PCT Pub. Date: Mar. 16, 2006

(65) Prior Publication Data

US 2008/0208978 A1    Aug. 28, 2008

(30) Foreign Application Priority Data

Sep. 9, 2004    (EP) .................... 04021492

(51) Int. Cl.
*G06F 15/16* (2006.01)

(52) U.S. Cl. ...................... 709/206; 709/226

(58) Field of Classification Search ............ 707/2, 707/8, 103 R; 600/300; 709/206
See application file for complete search history.

(56) References Cited

U.S. PATENT DOCUMENTS

| | | | | |
|---|---|---|---|---|
| 6,424,828 | B1 * | 7/2002 | Collins et al. | 455/412.1 |
| 6,792,082 | B1 * | 9/2004 | Levine | 379/67.1 |
| 2004/0063458 | A1 * | 4/2004 | Hori et al. | 455/554.2 |
| 2004/0087274 | A1 | 5/2004 | Ekberg et al. | |
| 2004/0088646 | A1 * | 5/2004 | Yeager et al. | 715/500 |
| 2004/0176081 | A1 * | 9/2004 | Bryham et al. | 455/414.1 |

FOREIGN PATENT DOCUMENTS

| | | |
|---|---|---|
| DE | 102 14 985 A1 | 1/2003 |
| EP | 1 320 214 A1 | 6/2003 |
| WO | WO 01/76154 | * 10/2001 |
| WO | WO 01/76154 A2 | 10/2001 |

\* cited by examiner

*Primary Examiner*—Dustin Nguyen
*Assistant Examiner*—Joel Mesa

(57) ABSTRACT

In one aspect, a data processing device which comprises an application for use in an ad-hoc network whereby the application is provided with a data interface to a central service for the processing of the first data is provided. A proxy instance is connected to the application via a first data connection for the exchange of the first data, while the proxy instance is connected to a plurality of additional data processing devices via the ad-hoc network for the exchange of second data. The proxy instance is adapted to generate the first data from the second data and to generate the second data from the first data, the exchange of the first data between the application and the proxy instance being carried out via the data interface.

21 Claims, 2 Drawing Sheets

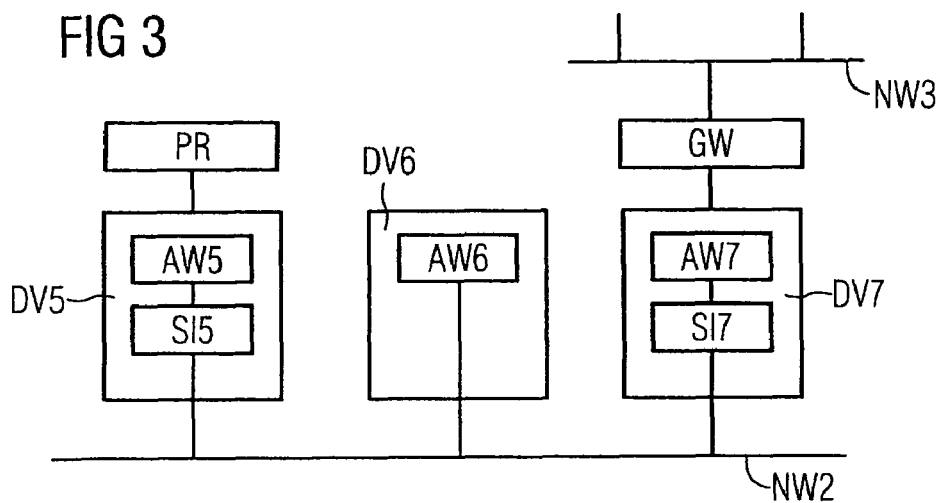
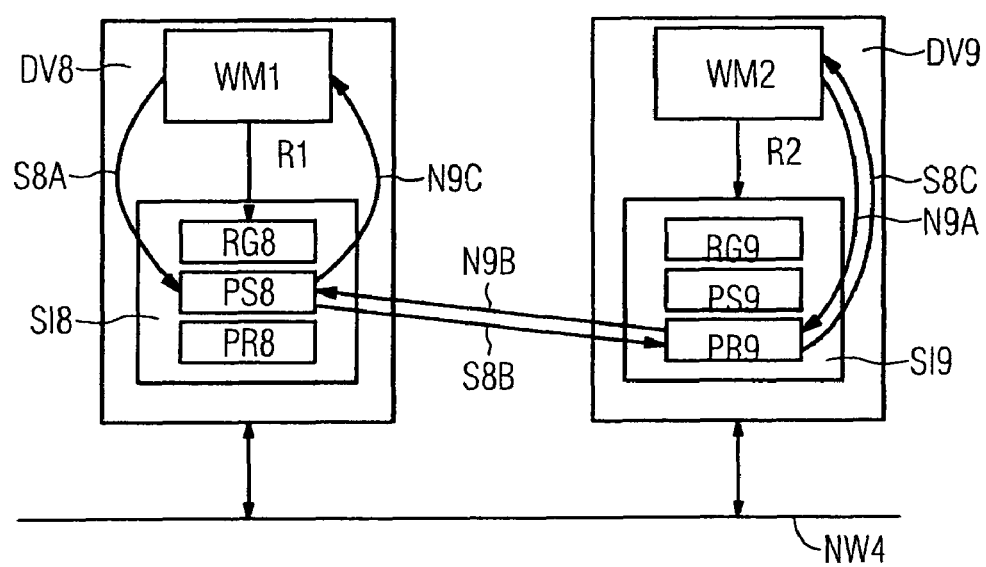

DATA PROCESSING DEVICE FOR USE IN AN AD-HOC NETWORK, AND CORRESPONDING AD-HOC NETWORK

CROSS REFERENCE TO RELATED APPLICATIONS

This application is the US National Stage of International Application No. PCT/EP2005/054039, filed Aug. 17, 2005 and claims the benefit thereof. The International Application claims the benefits of European application No. 04021492.6 EP filed Sep. 9, 2004, both of the applications are incorporated by reference herein in their entirety.

FIELD OF INVENTION

The invention relates to a data processing device for use in an ad-hoc network and to an ad-hoc network.

BACKGROUND OF INVENTION

Data processing devices are arranged in networks or are connected to networks so that information (data) can be interchanged between the data processing devices in the networks. Computers, PDAs, servers, printers, gateways, and other data processing devices have at least one processor, memory and at least one data interface. The data processing devices (computers, PDAs, servers, printers, gateways, etc.), including the communication components (telephones, VoIP telephones, searching systems, etc.) in the form of data processing devices, have a respective unique address, these addresses being able to be used by each network element (data processing device) to interchange information with another network element in the same network.

Networks frequently contain, besides the data processing devices, central services which are often also called "servers" or are installed on "servers", the central services being used by applications which are installed on the individual data processing devices. In this context, information is interchanged between a central service of this kind and an application which uses the central service. Normally, one and the same central service is available to a plurality of applications and hence a plurality of data processing devices for use, for example an e-mail server produced as a central service stores and conveys all electronic messages (e-mails, etc.) which are interchanged by the applications (in this case these are e-mail programs) on the connected data processing devices.

A special case of the networks described is what are known as "ad-hoc networks", where the data processing devices arranged in an ad-hoc network frequently change. An example of an ad-hoc network of this kind is what are known as "WLAN hotspots", in which all data processing devices which are situated within the radio range of the transmission/reception device can be part of the ad-hoc network. Data processing devices, particularly those with a wireless connection for data transmission, may even form an ad-hoc network without a central infrastructure ("hotspot") as soon as at least two data processing devices connect to one another and can interchange information. Another example of ad-hoc networks is what are known as "peer-to-peer networks", in which some (at least two) data processing devices in a network of any size (e.g. the internet) enter into a logical relationship with one another. Peer-to-peer networks of this kind are frequently used for file interchange, for example, or else for voice data communication ("VoIP telephony"), without using a circuit-switched network (telephone network) to do so.

SUMMARY OF INVENTION

It has been found to be a drawback of ad-hoc networks that the applications which are normally used and installed on the data processing devices are equipped with a data interface for a central service or for a few central services. When a data processing device of this kind with an application of this kind is introduced into an (another) ad-hoc network the application can be operated successively in this ad-hoc network only if an appropriate central service is available or can be contacted in this ad-hoc network. In the example of the e-mail servers, this means that all e-mail applications in the ad-hoc network need to have a connection to an e-mail server, with it understandably needing to be ensured that an e-mail server of this kind is actually present or can be contacted in the respective ad-hoc network.

It is an object of the invention to ensure or improve operation of the applications provided for a central service in ad-hoc networks.

The object is achieved for the data processing device and for the ad-hoc network by the features of the independent claims.

The object is achieved by providing a data processing device for use in an ad-hoc network, having an application for processing first information, the application for processing the first information being equipped with a data interface for a central service. The data processing device is equipped with a representative entity, where the representative entity is connected to the application via a first data link for the purpose of interchanging the first information, the representative entity is connected to a plurality of further data processing devices via second data links for the purpose of interchanging second information via the ad-hoc network, the representative entity is designed to form the first information from the second information and to form the second information from the first information, and the first information is interchanged between the application and the representative entity using the data interface. The application installed on the data processing device can therefore also be operated in ad-hoc networks in which the relevant central service is not or not yet available.

The object is also achieved by providing an ad-hoc network which contains at least a first and a second of the previously described data processing devices, the application on the first data processing device being designed to interchange information with the representative entity of the second data processing device. In an ad-hoc network of this kind, the representative entity of the second data processing device is therefore able to provide the functionality of the central service for the application on the first data processing device. If the interchange then takes place via the first representative entity, the latter then forms the central service for the first application, which means that in this case even if the data processing device changes to another ad-hoc network any existing registration with the service (formed by the first representative entity) by the first application can persist.

Advantageous refinements of the data processing device can be found in the features of the dependent claims. The features and advantages described therein apply mutatis mutandis to the inventive ad-hoc network too.

If the central service is a service for electronic messages and the first information is electronic messages, a user of the data processing device with the familiar application can also interchange electronic messages in networks in which it is not possible to contact a central service (central server) for electronic messages.

If the representative entity is designed to forward the electronic messages received from the application as first information to at least one of the further data processing devices, the received electronic message comprising an address for the at least one further data processing device, and the representative entity effecting the forwarding to the data processing device defined by this address, then the data processing devices in the ad-hoc network can use the familiar application, set up for a central server (central service), to interchange electronic messages with one another without first setting up a connection to a central service. In this case, the representative entity is advantageously designed to buffer-store electronic messages which are to be interchanged, as a result of which it is also possible to continue to operate applications requiring a central service (server) as an information store unchanged. This produces a comprehensive functionality if the electronic messages are e-mail messages, fax messages, appointment elements or calendar entries.

If the application is an apparatus for accessing a resource, where at least one of the second data links allows the resource to be used by at least one of the further data processing devices, then one and the same resource can be made available to a plurality of or all data processing devices in the ad-hoc network. This is particularly advantageous if the resource which can be used by the at least one further data processing device is a printer or a network access point (router, gateway), because these resources do not then need to be provided separately for each data processing device, but rather can be used alternately or simultaneously by a plurality of data processing devices. In this context, the representative entity is advantageously provided with an authorization apparatus, the authorization apparatus being designed to enable and/or disable the resource, which can be accessed via the application, for at least one of the further data processing devices. An authorization apparatus of this kind firstly allows abuse of resources to be avoided and secondly allows the use of resources for which payment is required only by those data processing devices or their applications where the payment of usage fees is assured.

A user of the data processing device can obtain information about the state of the other data processing devices or about the availability of their users if the application is designed to process presence information from at least one of the further data processing devices, and the representative entity is set up to receive the presence information as second information via at least one of the second data links from at least one of the further data processing devices and to forward the presence information as first information to the application. In this context, the application is advantageously designed to generate presence information about the data processing device and/or a user of the data processing device as first information, and the representative entity is set up to send the generated presence information as second information via at least one of the second data links to at least one of the further data processing devices. This allows the representative entity to produce and send the presence information for the further data processing devices or their users, so that the applications on the further data processing devices can also be operated without access to a central presence server (central service). In this case, customary applications and applications which are frequently already present can continue to be operated if the applications are set up to interchange the presence information as first information on the basis of the SIP protocol, and at least one of the representative entities has an SIP presence registration function and an SIP presence server function.

If the application comprises a display function or a processing function for addresses, and the representative entity is designed to transmit the address of at least one of the further data processing devices as first information to the application, a user of the application can access the display function or the processing function in order to access the address of the at least one further data processing device without the need for this address to be transmitted manually to the application. The administration is simplified further by virtue of the representative entity being set up to retrieve the address which is to be transmitted to the application as second information from the at least one further data processing device, as a result of which even data processing devices which have recently been introduced into the ad-hoc network can automatically be accessed by the application using their addresses. In this case, the application is advantageously a display and processing program for electronic messages, with the address then ideally being able to be used to send electronic messages.

BRIEF DESCRIPTION OF THE DRAWINGS

Exemplary embodiments of a data processing device based on the invention are explained below with reference to the drawings and serve simultaneously to explain exemplary embodiments of ad-hoc networks based on the invention. In the drawings:

FIG. 3 shows a network with three data processing devices, two resources and a further network, and FIG. 4 shows two data processing devices with applications for interchanging presence information in a network.

DETAILED DESCRIPTION OF INVENTION

Figure 1:
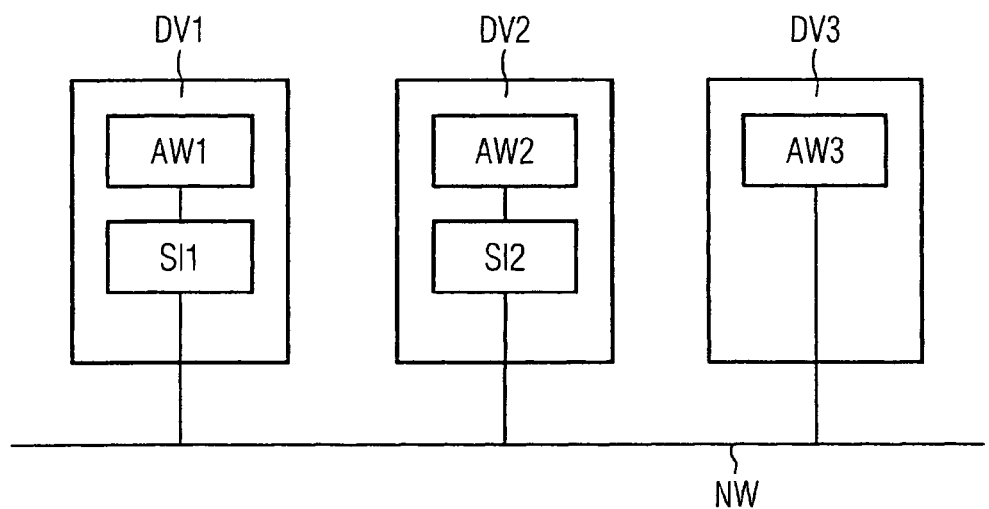
FIG. 1 shows a network with three data processing devices.

FIG. 1 shows the data processing devices DV1, DV2, DV3 which are arranged in an ad-hoc network NW and can use this ad-hoc network NW to transmit (interchange) information (data) among one another. In the present exemplary embodiment, the ad-hoc network NW is what is known as a "wireless LAN", that is to say a network based on radio technology. In this arrangement, the data processing devices DV1, DV2, DV3 shown can interchange information with one another directly without the need for a central entity (router, network node etc.). As an alternative to the wireless ad-hoc network NW shown, it is naturally also possible to use a wired network. The particular distinguishing feature of the ad-hoc network NW is that all the data processing devices DV1, DV2, DV3 which are currently able to contact one another "at random" according to their radio range or are arranged in the same radio cell are part of the ad-hoc network NW or form this network. The inventive data processing devices DV1, DV2, DV3 can naturally also be operated alternatively in a non-ad-hoc network; in this case, it may be necessary to register with a network node which is to be used.

The data processing devices DV1, DV2, DV3 shown are respectively provided with an application AW1, AW2, AW3, the data processing devices DV1, DV2 being equipped with a respective representative entity SI1, SI2. In principle, the data processing devices DV4, DV5, DV6, DV7, DV8, DV9 described in FIGS. 2 to 4 and also the networks NW2, NW3, NW4 shown therein are also of similar design to the previously described data processing devices DV1, DV2, DV3 and to the ad-hoc network NW, respectively. If the data processing devices and components described below are not described differently, the features and properties described above apply to them.

The text below uses the data processing device DV4 shown schematically in FIG. 2 to explain the operation of an application ENA for interchanging electronic messages in an ad-hoc network. The application ENA is what is known as a "mail client", that is to say an application program which provides a user interface for sending and receiving electronic messages, the electronic messages including not only the known e-mails but also appointment and calendar entries, fax messages, voice files (particularly from what are known as "unified messaging" systems) etc. In the present exemplary embodiment, the program Microsoft Outlook is used; it is naturally also possible to use another application program of this kind.

The application ENA is in a form such that it interchanges the electronic messages with a central service, in the present exemplary embodiment the Microsoft Exchange Server. In this case, a central service of this kind forms the basis for a large number of similar or identical applications according to the type of the application ENA. The application ENA is equipped with a data interface which is provided for interchanging information (data) with the central service via a network. To this end, in the "server-based" application instance, the data interface is connected to the central service directly, e.g. by means of a data channel.

The data processing device DV4 is equipped with a representative entity SI4 which is connected to the application ENA via the data interface. The application ENA thus now interchanges information (data) with the representative entity SI4 via the data interface instead of interchanging the information with the central service (which is not present in the ad-hoc network under consideration).

Like all the data processing devices shown in the exemplary embodiments, the data processing device DV4 has a search function for finding other data processing devices in the ad-hoc network. Search functions of this kind are known from what are known as "peer-to-peer networks" and are not described in more detail at this juncture. A repeatedly performed search for other data processing devices provides the data processing device DV4 with the addresses (network addresses) of other data processing devices which are likewise equipped with a representative entity in the style of the representative entity SI4 and with an application in the style of or similar to the application ENA. This provides the representative entity SI4 with the communication addresses (network addresses) of the other data processing devices and with the access parameters of the representative entities installed there (if present).

A user of the application ENA now writes an electronic message, for example an e-mail message or an appointment request, and activates the "send" function on the application ENA. This causes the application ENA to transmit the electronic message as first information to the representative entity SI4, where the electronic message is received by the module MPK (mail proxy component). In this context, the module MPK interchanges the first information with the application ENA in the same way in which it is also done by a central service (not present here). The module MPK then decides whether the data processing device DV4 is currently part of a network (ad-hoc network) without a central service for processing electronic messages, or is part of a network in which a central service of this kind is available. In the present exemplary embodiment, a central service is not available in the network, which means that the module MPK forwards the electronic message to another module MQ (mail queue); otherwise, the central service would be used.

Here, the electronic message is buffer-stored and the receiver address contained in the electronic message is used to check whether the desired receiver is a user of another application available in the network for interchanging electronic messages. In situations in which this is not the case, the module MQ stores the electronic message either until an application associated with the desired receiver is available in the network or until an appropriate central service (mail server) is available. In the present exemplary embodiment, however, it is possible to forward the electronic message to another data processing device. For this reason, the electronic message is converted into second information by the representative entity SI4, and for this conversion the electronic message is provided with the address information of the further data processing device. The electronic message is now transmitted via the network to the further data processing device, is received by the representative entity there, is buffer-stored and, if required, is converted into the data format of the application there. The electronic message can then be retrieved by the application there from the buffer store in the representative entity there.

Alternatively, the application installed on the further data processing device can also interchange data with the representative entity SI4 of the data processing device DV4 directly. The further application then needs to be registered as a "client" with the representative entity SI4 in the same way as the application ENA.

Networks frequently have resources available, such resources being connected to a data processing device and being able to be used by at least one application from the connected data processing device. FIG. 3 shows a network NW2 containing the data processing devices DV5, DV6, DV7. The data processing device DV5 has the resource PR connected to it (PR printer), this resource being used by the application AW5 (in this case: what is known as a "printer driver"). The data processing device DV7 has the resource GW (GW=gateway) connected to it, with the resource GW allowing the change of information to a further network NW3. In this case, the resource GW is used on the network NW2 by the application AW7 from the data processing device DV7. In this context, the application AW7 is what is known as a "driver", which is designed to interact with a central service program, in this case what is known as "gateway server software".

The text below describes the way in which the application AW6 (a word processing program) installed on the data processing device DV6 uses the resource PR (printer) which is connected to the data processing device DV5.

The operating system on the data processing device DV6 uses the connections to the network NW2 to search the network for a central service "print server", that is to say for a network-based service for printing documents. Such a search message transmitted in this context is received by the representative entity SI5, where the application AW5 (printer driver) is connected to the consequently available resource PR (printer). The representative entity SI5 therefore responds to the search message, so that it is registered as "printer server" with the application AW6. To print a document, the application AW6 sends the document as second information via the network NW2 to the representative entity SI5, where the document is received and converted into first information. This conversion involves the document being converted into an internal data format for the data processing device DV5, so that the document to be printed is received by a data interface of the application AW5 in the same way as if the application AW6 were a word processing program installed on the data processing device DV5. Consequently, the document is printed by the application AW5 using the resource PR. It goes without saying that status messages from the resource PR which are produced in the process are returned to the application AW6 via the same route.

It is subsequently assumed that the application AW6 is a communication application for a voice data network (VoIP network). In a similar way to the example described above, the application AW6 can then use the representative entity SI7 and the application AW7 to use the resource GW for communication links to communication partners in the network NW3. In this context, the representative entity SI7 is what is known as a "proxy", which uses the application AW7 and hence the resource GW in the data processing device DV7 instead of a locally installed application. In so doing, the representative entity SI7 "terminates" the connections which are routed from the application AW6 via the network NW2 to the communication partner. The second information (useful data) interchanged via this connection is converted by the representative entity SI7 into a further data stream (further connection), which is routed via the application AW7 and the resource GW to the communication partner in the network NW3. It goes without saying that the use of the representative entity SI7 is dependent on authentication which has taken place beforehand, which is used to ensure that the application AW6 is authorized to use the resource GW.

FIG. 4 is now used to explain the way in which the data processing devices DV8, DV9 in the network NW4 interchange presence information among one another without a central presence server. In this context, the applications WM1, WM2 are applications which are set up to process and display presence information which said applications respectively interchange with a central service (presence server) as first information. Instead of being connected to the central service the applications WM1, WM2—in this exemplary embodiment they are the known Microsoft Windows Messenger—are connected to the representative entities SI8, SI9 by means of a respective data interface. In the present exemplary embodiment, the first information interchanged via the data interfaces is respectively interchanged on the basis of the SIP protocol. In a similar way to an SIP compliant central service (which is not present in this case), the representative entities SI8, SI9 respectively have an SIP registrar RG8, RG9, an (internal) SIP presence server PS8, PS9 and what is known as an "SIP proxy" PR8, PR9.

It is subsequently assumed that the data processing devices DV8, DV9, having started, have respectively searched for other data processing devices of the same type and are respectively in possession of the communication address (access parameter) of the respective other data processing device DV8, DV9 shown.

In a first step, the application WM1 registers with the SIP register RG8, and the application WM2 registers with the SIP registrar RG9. Whereas, when a central service (central presence server) is present, each application WM1, WM2 registers with the SIP registrar of the (one) central service, the representative entity SI8 is this central service for the application WM1, while the representative entity SI9 forms the central service (central presence server) for the application WM2.

For this exemplary embodiment, it is assumed that the application WM1 is to be used to monitor the presence state of a user of the application WM2, that is to say to establish whether or not the application WM2 can be used to contact the user of the application WM2, for example. To monitor the application WM2, the application WM1 uses its data interface to send a "Subscribe" message S8A to the SIP presence server PS8 of the representative entity SI8. In this context, the "Subscribe" message S8A is addressed to the representative entity SI8 and is thus available as first information in a first data format. It is converted into second information by the representative entity SI8 by (re)addressing it to the data processing device DV9, and is then sent to the SIP proxy. PR9 via the network NW4. For the SIP presence server PS8, the SIP proxy PR9 represents the application WM2 to be monitored, and receives the converted "Subscribe" message S8A as "Subscribe" message S8B. The representative entity SI9 recognizes that the "Subscribe" message S8B relates to the application WM2, addresses it to the "internal" application WM2 and forwards it thereto as "Subscribe" message S8C.

The application WM2 checks whether the requesting application WM1 is authorized to monitor its state and from then on reports any change of state by sending a respective appropriate "Notify" message N9A to that SIP proxy PR9 from which the application WM2 has received the Subscribe message S8C. A "Notify" message N9A of this kind which has been received from the SIP proxy PR9 is evaluated by the SIP proxy PR9, where it is established that this "Notify" message N9A is a response message to the "Subscribe" message S8B from the present server PS8. Accordingly, the "Notify" message N9A is converted (readdressed) and transmitted to the presence server PS8 as "Notify" message N9B. There, the correspondingly changed state of the application WM2 is registered and, on the basis of the "Subscribe" message S8A received earlier, is converted into a "Notify" message N9C which is sent to the application WM1 and is displayed or processed there.

In another embodiment, the representative entity SI8 is designed such that in networks which contain a central presence service the "internal" presence server PS8 is not used, but rather the messages from the application WM1 which are sent to it are forwarded to the central presence service which is then provided.

Figure 2:
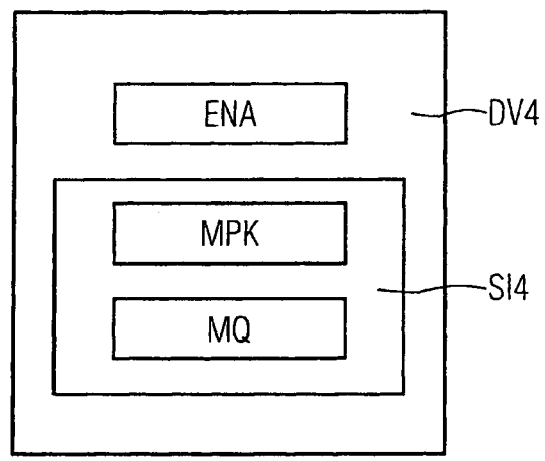
FIG. 2 shows a data processing device with an electronic message application and a representative entity with a mail proxy component and a mail queue.

If the data processing device DV8 holds a further application (not shown) with an address directory, for example in the manner of the application ENA outlined using FIG. 2, the representative entity SI8 can temporarily enter the names and the communication addresses of the users of other data processing devices (in this case data processing device DV9 with application WM2) into the address directory of the respective application. The "dynamic" result of this is convenient access to all those applications and users which are currently available via the ad-hoc network and have previously been found using a presence service or a search function. This also relates to those other data processing devices which have "registered" themselves with the data processing device DV8 without a search.

The invention claimed is:

1. A data processing device having a processor connected to memory to run software applications stored on the memory and a data interface for use in an ad-hoc network, comprising:

an application stored in the memory for processing a first information, the application configured to access a central service via the data interface to transmit data to the central service and receive data from the central service; and a representative entity connected to the application via the data interface for exchanging the first information, the representative entity configured to connect to a plurality of further data processing devices via data links for exchanging a second information via the ad-hoc network, the representative entity adapted to form the first information from the second information and to form the second information from the first information;

the representative entity:

configured to determine if the central service is available, configured to determine whether a desired receiver of the first information is a user of a further data processing device available via the ad-hoc network if the representative entity determines that the central service is unavailable, and configured to forward the second information to the further data processing device of the desired receiver if the representative entity determines that the desired receiver is available via a further data processing device in the ad-hoc network.

2. The data processing device according to claim 1, wherein the central service is a service for electronic messages provided by a central server and wherein the first information is at least one electronic message.

3. The data processing device according to claim 2, wherein the at least one electronic message has address information of the further data processing device of the desired receiver and the representative entity is configured to effect the forwarding of the at least one electronic message as second information to the further data processing device available at the address information.

4. The data processing device according to claim 2, wherein the representative entity is adapted to buffer-store the at least one electronic message to be forwarded or exchanged if the representative entity determines that the central service is unavailable and the further data processing device of the desired receiver is not available.

5. The data processing device according to claim 2, wherein the representative entity is adapted to process e-mail messages, appointment elements or calendar entries as the at least one electronic message.

6. The data processing device according to claim 1, wherein the application is configured to access a resource, and wherein at least one of the data links allows the resource to be used by at least one of the further data processing devices.

7. The data processing device according to claim 6, wherein the representative entity is provided with an authorization apparatus adapted to enable or disable the resource.

8. The data processing device according to claim 6, wherein the resource is a printer or a network access point.

9. The data processing device according to claim 8, wherein the data processing device is a computer, a PDA or a phone.

10. The data processing device according to claim 1, wherein the application is adapted such that the data processing device is able to process presence information from at least one of the further data processing devices, and wherein the representative entity is set up to receive the presence information as second information via at least one of the data links from at least one of the further data processing devices and to forward the presence information as first information to the application.

11. The data processing device according to claim 10, wherein the application is set up to exchange the presence information as first information based on a SIP protocol, and wherein the representative entity includes an SIP presence registration function and an SIP presence server function.

12. The data processing device according to claim 11, wherein the application is adapted to generate presence information about the data processing device or of a user of the data processing device as first information, and wherein the representative entity is set up to send the generated presence information as second information via at least one of the data links to at least one of the further data processing devices.

13. The data processing device according to claim 1, wherein the application is adapted to generate presence information about the data processing device or of a user of the data processing device as first information, and wherein the representative entity is set up to send the generated presence information as second information via at least one of the data links to at least one of the further data processing devices.

14. The data processing device according to claim 1, wherein the application comprises a display function or a processing function for addresses, and wherein the representative entity is adapted to transmit an address of at least one of the further data processing devices in first information to the application.

15. The data processing device according to claim 14, wherein the representative entity is set up to retrieve the address to be transmitted to the application as second information from the at least one further data processing device.

16. The data processing device according to claim 14, wherein the application is a display and processing program for electronic messages that is stored in the memory and run by the processor, and the address can be used to send electronic messages.

17. An ad-hoc communication network, comprising:

a plurality of processing devices, each data processing device having at least one processor, memory, and at least one data interface, each data processing device comprising:

an application for processing a first information, the application configured to access a central service via the at least one data interface to transmit data to the central service and receive data from the central service, and a representative entity connected to the application via a first data link for exchanging the first information, the representative entity connected to other data processing devices of the plurality of data processing devices via second data links for exchanging a second information via the ad-hoc network, the representative entity adapted to form the first information from the second information and to form the second information from the first information, and the representative entity:

configured to determine if the central service is available, configured to determine whether a desired receiver of the first information is a user of a further data processing device available via the ad-hoc network if the representative entity determines that the central service is unavailable, and configured to forward the second information to the further data processing device of the desired receiver if the representative entity determines that the desired receiver is available via a further data processing device in the ad-hoc network.

18. An ad-hoc communication network according to claim 17, wherein the plurality of data processing devices is comprised of a first data processing device and a second data processing device, the application of the second data processing device adapted to exchange information with the representative entity of the first data processing device.

19. An ad-hoc communication network according to claim 17, wherein the plurality of data processing devices is comprised of a first data processing device and a second data processing device, the application of the first data processing device set up to exchange the information using the representative entity of the first data processing device.

20. An ad-hoc communication network according to claim 19, wherein the application of the second data processing device is adapted to exchange information with the representative entity of the first data processing device.

21. The ad-hoc communication network of claim 20 wherein each of the data processing devices is a computer, a PDA or a phone.

* * * * *